United States Patent [19]
Ichinohe

[11] Patent Number: 5,104,998
[45] Date of Patent: Apr. 14, 1992

[54] ORGANOPOLYSILOXANE MODIFIED WITH POLYETHER AND HIGHER APLIPHATIC ETHER

[75] Inventor: Shoji Ichinohe, Annaka, Japan

[73] Assignee: Shin-Etsu Chemical Co., Ltd., Tokyo, Japan

[21] Appl. No.: 703,618

[22] Filed: May 21, 1991

[30] Foreign Application Priority Data

May 31, 1990 [JP] Japan .................. 2-142576

[51] Int. Cl.$^5$ .............................. C07F 7/08
[52] U.S. Cl. ..................... 556/445; 556/437
[58] Field of Search .......... 556/445, 437, 453; 528/29

[56] References Cited

U.S. PATENT DOCUMENTS

| | | | |
|---|---|---|---|
| 4,113,760 | 9/1978 | Frey et al. | 556/445 X |
| 4,658,006 | 4/1987 | Inoue | 528/29 |
| 4,950,726 | 8/1990 | Yoshioka et al. | 556/453 X |
| 5,045,621 | 9/1991 | Suzuki | 556/453 X |

Primary Examiner—Arthur C. Prescott
Attorney, Agent, or Firm—Wyatt, Gerber, Burke & Badie

[57] ABSTRACT

A novel organopolysiloxane compound, which has high surface activity to form an emulsion of the water-in-oil type of various hardly emulsifiable materials, is proposed. The organopolysiloxane compound is a dimethylpolysiloxane having two types of modifying groups including polyether or polyoxyalkylene groups on one hand and higher alkyl groups bonded to the silicon atoms through an ether linkage on the other hand bonded to the silicon atoms. Different from conventional dually modified dimethylpolysiloxanes as an emulsifying agent having modifying groups of polyether groups and higher alkyl groups directly bonded to the silicon atoms, the dually modified dimethylpolysiloxane of the invention can be synthesized easily in a one-step process of the reaction in addition to the advantage of excellent emulsifying activity for various kinds of hardly emulsifiable liquids as compared with conventional emulsifying agents.

5 Claims, 7 Drawing Sheets

ORGANOPOLYSILOXANE MODIFIED WITH POLYETHER AND HIGHER APLIPHATIC ETHER

BACKGROUND OF THE INVENTION

The present invention relates to a novel organopolysiloxane compound not known in the prior art nor described in any literatures or, more particularly, to a novel organopolysiloxane compound having excellent surface activity and useful as an emulsifying agent to prepare an aqueous emulsion of the water-in-oil type.

Various types of organopolysiloxane compounds having surface activity are known in the prior art including those useful as an emulsifying agent in the preparation of a water-in-oil emulsion, of which Japanese Patent Kokai 61-90732 discloses an organopolysiloxane compound modified jointly with polyether groups and long-chain alkyl groups having 8 to 18 carbon atoms.

The above mentioned organopolysiloxane compound jointly modified with two types of modifying groups is useful as an emulsifying agent for silicones but not suitable for the emulsification of ester oils and glycerides due to the relatively low surface activity. In addition, such a jointly modified organopolysiloxane has a problem in the complicated synthetic preparation procedure thereof. Namely, such a jointly modified organopolysiloxane is prepared by a mixed hydrosilation reaction or so-called addition reaction of an allylated polyether for the modifying polyether groups and a long-chain α-olefin compound for the modifying long-chain alkyl groups to an organohydrogenpolysiloxane having silicon-bonded hydrogen atoms in the presence of a platinum catalyst according to a well known procedure. When the allylated polyether and the α-olefin compound are concurrently brought to the addition reaction with the organohydrogenpolysiloxane, the reaction cannot proceed evenly for these two different reactants eventually to cause phase separation of the reaction mixture because the velocities of the addition reaction of the two reactants greatly differ from each other, the allylated polyether being generally more reactive than the α-olefin. Therefore, the synthetic process must be conducted in two successive steps including a first step in which the α-olefin compound is brought to the addition reaction with a part of the silicon-bonded hydrogen atoms in the organohydrogenpolysiloxane and a second step in which the remaining silicon-bonded hydrogen atoms are reacted with the allylated polyether compound.

Thus, it is eagerly desired to develope a novel organopolysiloxane useful as an emulsifying agent for the preparation of a water-in-oil emulsion of any hardly emulsifiable oily materials without the above described problems and disadvantages in the prior art in connection with the complicated preparation process.

SUMMARY OF THE INVENTION

The present invention accordingly has an object to provide a novel organopolysiloxane which can be prepared in a single-step process and useful as an emulsifying agent for the preparation of a water-in-oil emulsion of any hardly emulsifiable oily materials.

Thus, the novel organopolysiloxane compound of the invention is an organopolysiloxane modified jointly with polyether groups and long-chain aliphatic ether groups as represented by the general formula

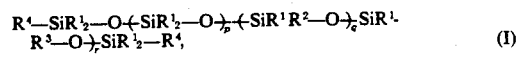
(I)

in which $R^1$ is an alkyl group having 1 to 4 carbon atoms, $R^2$ is a polyether group of the formula

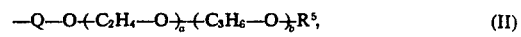
(II)

Q being a divalent hydrocarbon group having 2 to 4 carbon atoms, $R^5$ being a hydrogen atom, alkyl group having 1 to 4 carbon atoms or acetyl group, the subscript a being a positive integer and the subscript b being zero or a positive integer, $R^3$ is a long-chain aliphatic ether group of the formula

(III)

Q having the same meaning as defined above and $R^6$ being a monovalent hydrocarbon group having 8 to 30 carbon atoms, $R^4$ is $R^1$, $R^2$ or $R^3$, the subscript p is zero or a positive integer and the subscripts q and r are each a positive integer.

DETAILED DESCRIPTION OF THE PREFERRED EMBODIMENTS

Figure 1:
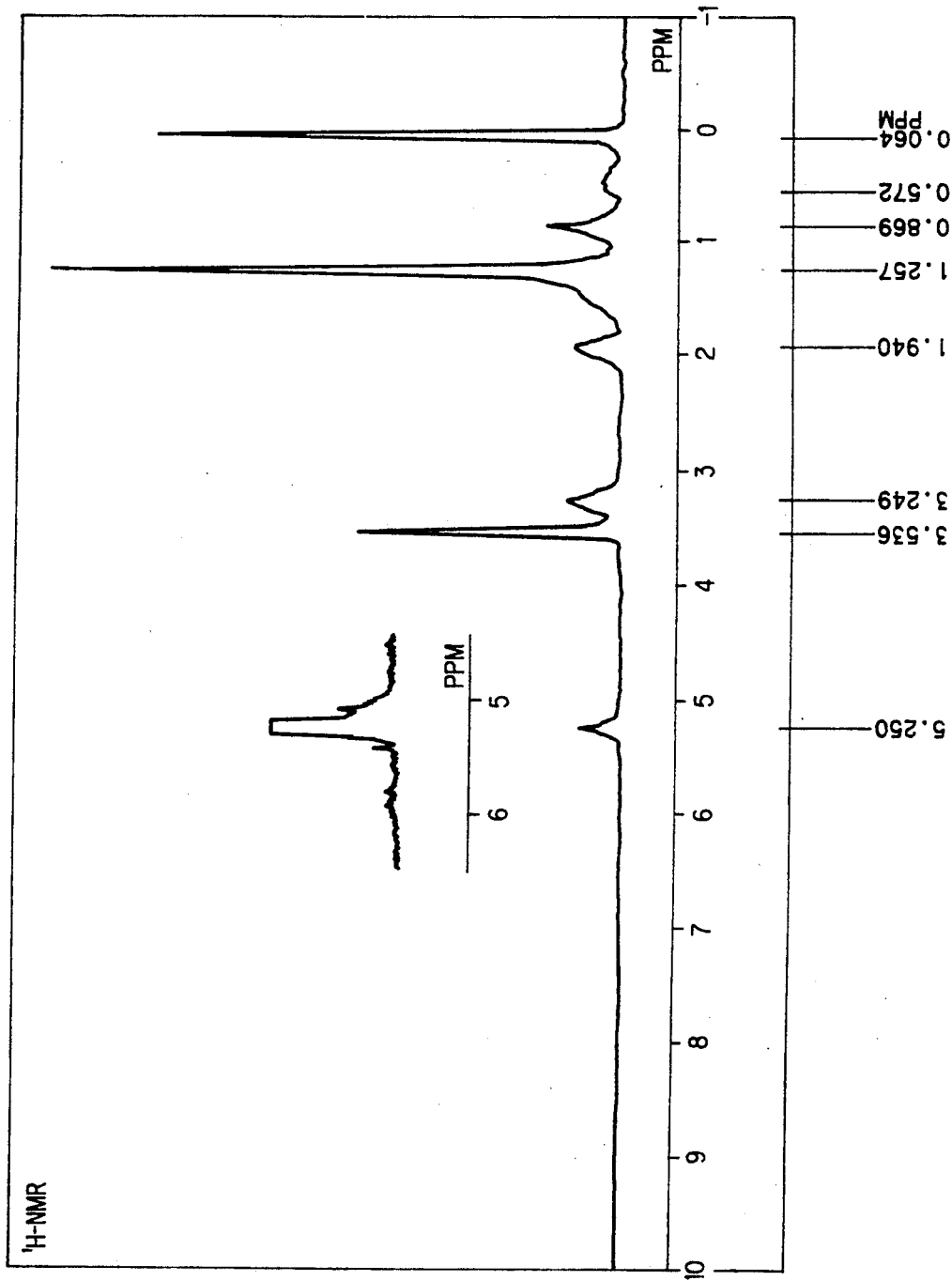
FIGS. 1 and 2 are each an NMR spectrum and an infrared absorption spectrum, respectively, of the inventive organopolysiloxane modified jointly with polyether groups and long-chain aliphatic ether groups as prepared in Example 1.

As is defined above, the most characteristic feature of the organopolysiloxane compound of the invention, which is a novel compound not knonw in the prior art nor described in any literatures, consists in the modification jointly with polyether groups of the formula (II) and long-chain aliphatic ether groups of the formula (III). This jointly modified organopolysiloxane can be prepared by a mixed hydrosilation reaction of an organohydrogenpolysiloxane with, for example, an allylated polyether compound on one hand and an allyl ether of a long-chain aliphatic alcohol on the other hand. Different from the above described mixed hydrosilation reaction in the preparation of the polyether and long-chain alkyl-modified organopolysiloxane by using an allylated polyether and a long-chain α-olefin as the reactants, advantageously, the velocities of the hydrosilation reactions of the two different reactants in this case are about the same so that the reaction can proceed uniformly without the trouble of eventual phase separation taking place in the reaction mixture even when the two different reactants are concurrently brought into the reaction with the organohydrogenpolysiloxane in one and the same reaction mixture. In addition, the jointly modified organopolysiloxane of the invention has excellent surface activity so that it is useful as an emulsifying agent not only for silicone compounds but also for other hardly emulsifiable materials, such as ester oils and glycerides, to give a water-in-oil emulsion.

The jointly modified organopolysiloxane of the invention is represented by the general formula (I) given above, i.e.:

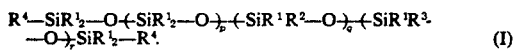
(I)

In the formula, $R^1$ is an alkyl group having 1 to 4 carbon atoms such as methyl, ethyl, propyl and butyl groups or, preferably, a methyl group. The group denoted by $R^2$, as the modifying group of the first class, is a polyether group represented by the formula

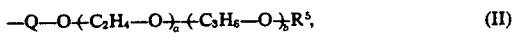
(II)

in which Q is a divalent hydrocarbon group having 2 to 4 carbon atoms such as ethylene, propylene and butylene groups or, preferably, propylene group $-CH_2CH_2CH_2-$, $R^5$ is a hydrogen atom, alkyl group having 1 to 4 carbon atoms such as methyl, ethyl, propyl and butyl groups or acetyl group, the subscript a is a positive integer and the subscript b is zero or a positive integer. The group denoted by $R^3$, as the modifying group of the second class, is a long-chain aliphatic ether group of the formula

(III)

in which Q has the same meaning as defined above and $R^6$ is a monovalent hydrocarbon group having 8 to 30 carbon atoms. The group denoted by $R^4$ at the molecular chain end can be the same as $R^1$, $R^2$ or $R^3$. The subscript p is zero or a positive integer and the subscripts q and r are each a positive integer so that the modified organopolysiloxane molecule has at least one of each of the two different types of the modifying groups.

The above defined jointly modified organopolysiloxane can be prepared by a mixed hydrosilation reaction of an organohydrogenpolysiloxane represented by the general formula

(IV)

in which $R^1$, p, q and r each have the same meaning as defined above and $R^7$ is a hydrogen atom or $R^1$, with a polyether etherified at one molecular chain end with a group ethylenically unsaturated at the ω-position, e.g., allyl group, as the first modifying agent and an ether of a long-chain alcohol with a group ethylenically unsaturated at the ω-position, e.g., allyl group, as the second modifying agent. The total amount of the above mentioned two classes of the modifying agents should be at least equimolar to the silicon-bonded hydrogen atoms in the organohydrogenpolysiloxane. As is well known, the hydrosilation reaction can be promoted by a catalytic amount of a platinum compound.

The ethylenically ω-unsaturated group at one of the molecular chain ends of the polyether compound as the first modifying agent is preferably an allyl group or a methacryloxyalkyl group forming an ether while the group blocking the other molecular chain end of the polyether compound is a hydrogen atom, lower alkyl group, such as methyl, ethyl, propyl and butyl groups, or acetyl group. The polyoxyalkylene moiety, which can be a combination of a polyoxyethylene moiety and polyoxypropylene moiety, is preferably a polyoxyethylene moiety without polyoxypropylene units so that the subscript b in the formula (II) is equal to zero in view of the hydrophilicity of the modifying groups.

The long-chain alcohol forming the ether as the second modifying agent has from 8 to 30 carbon atoms in a molecule but is preferably oleyl alcohol or isostearyl alcohol so that the group denoted by $R^6$ in the formula (III) is oleyl or isostearyl group though not particularly limitative thereto including any known higher alcohols having 8 to 30 carbon atoms in a molecule. The ethylenically ω-unsaturated group forming the ether as the second modifying agent with the above mentioned long-chain alcohol is preferably an allyl or methacryloxyalkyl group.

The platinum compound suitable as the catalyst for promoting the hydrosilation reaction is well known in the art. Although platinum in the elementary form, e.g., platinum black, is effective, the platinum catalyst should preferably be a platinum compound such as chloroplatinic acid, alcoholic solution of chloroplatinic acid or a complex of chloroplatinic acid with an olefin or vinyl siloxane.

The respective amounts of the above described first and second modifying agents as the reactants on the organohydrogenpolysiloxane depend on the types of the respective reactants and desired surface activity of the product for forming a water-in-oil emulsion. As a rough measure to ensure good surface activity of the product, the amount of the long-chain aliphatic ether compound as the second modifying agent is in the range from 10 to 1000% by weight based on the organohydrogenpolysiloxane and the amount of the polyether compound as the first modifying agent is in the range from 10 to 30% by weight in the reaction mixture composed of the organohydrogenpolysiloxane and the first and the second modifying agents with the proviso that the total amount of them is at least equimolar to the silicon-bonded hydrogen atoms in the organohydrogenpolysiloxane. When the total amount of the two modifying agents is in excess of the equimolar amount to the silicon-bonded hydrogen atoms in the organohydrogenpolysiloxane, unreacted modifying agents necessarily remain in the reaction mixture after completion of the reaction. The reaction mixture, however, can be used as such as the emulsifying agent in most cases without purification by removing the unreacted reactants.

The hydrosilation reaction can easily proceed by heating the reaction mixture at a temperature in the range from 30° to 200° C. or, preferably, from 60° to 110° C. The reaction mixture can be undiluted or diluted according to need with a suitable organic solvent such as ethyl alcohol, isopropyl alcohol, toluene, tetrahydrofuran, dioxane, methyl acetate, methyl ethyl ketone, trichloroethane and the like. When an organic solvent is used as a diluent, the reaction mixture after completion of the reaction is subjected to a stripping treatment to remove the solvent under reduced pressure, A preferable way to conduct the hydrosilation reaction is that the organohydrogenpolysiloxane is admixed with the two types of the modifying agents in a total amount equimolar to the silicon-bonded hydrogen atoms therein together with a platinum catalyst and, when the reaction comes near to the end point as indicated by the analytical result for the silicon-bonded hydrogen atoms, a small amount of an additional portion of the long-chain aliphatic ether compound as the second modifying agent is added to the reaction mixture to complete the reaction and to obtain the desired product which has excellent surface activity for the emulsification of not only silicones but also ester oils, glycerides and other hardly emulsifiable liquids.

In the following, the inventive organopolysiloxane modified jointly with the two classes of the modifying agents is described in more detail by way of examples.

EXAMPLE 1

A reaction mixture was prepared by mixing, in a flask of 2 liter capacity, 183 g (0.1 mole) of a methyl hydrogen polysiloxane expressed by the average structural formula

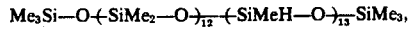

in which Me is a methyl group, 308 g (1 mole) of allyl oleyl ether, 136 g (0.3 mole) of an allylated polyoxyethylene expressed by the average formula $$CH_2=CH-CH_2-O-(CH_2CH_2-O-)_9H$$

and 500 g of ethyl alcohol as the solvent with further admixture of 2 g of an ethyl alcohol solution of a vinyl siloxane complex of chloroplatinic acid in a concentration of 0.5% by weight as platinum and the reaction mixture was heated under reflux for 5 hours to effect the hydrosilation reaction. After completion of the reaction, the reaction mixture was freed from the solvent by evaporation under reduced pressure and the unevaporated residual liquid was filtered to give 570 g, corresponding to 91% of the total amount of the reactants, of an oily product having a viscosity of 329 centistokes at 25° C. and refractive index of 1.4523 at 25° C.

Figure 2:
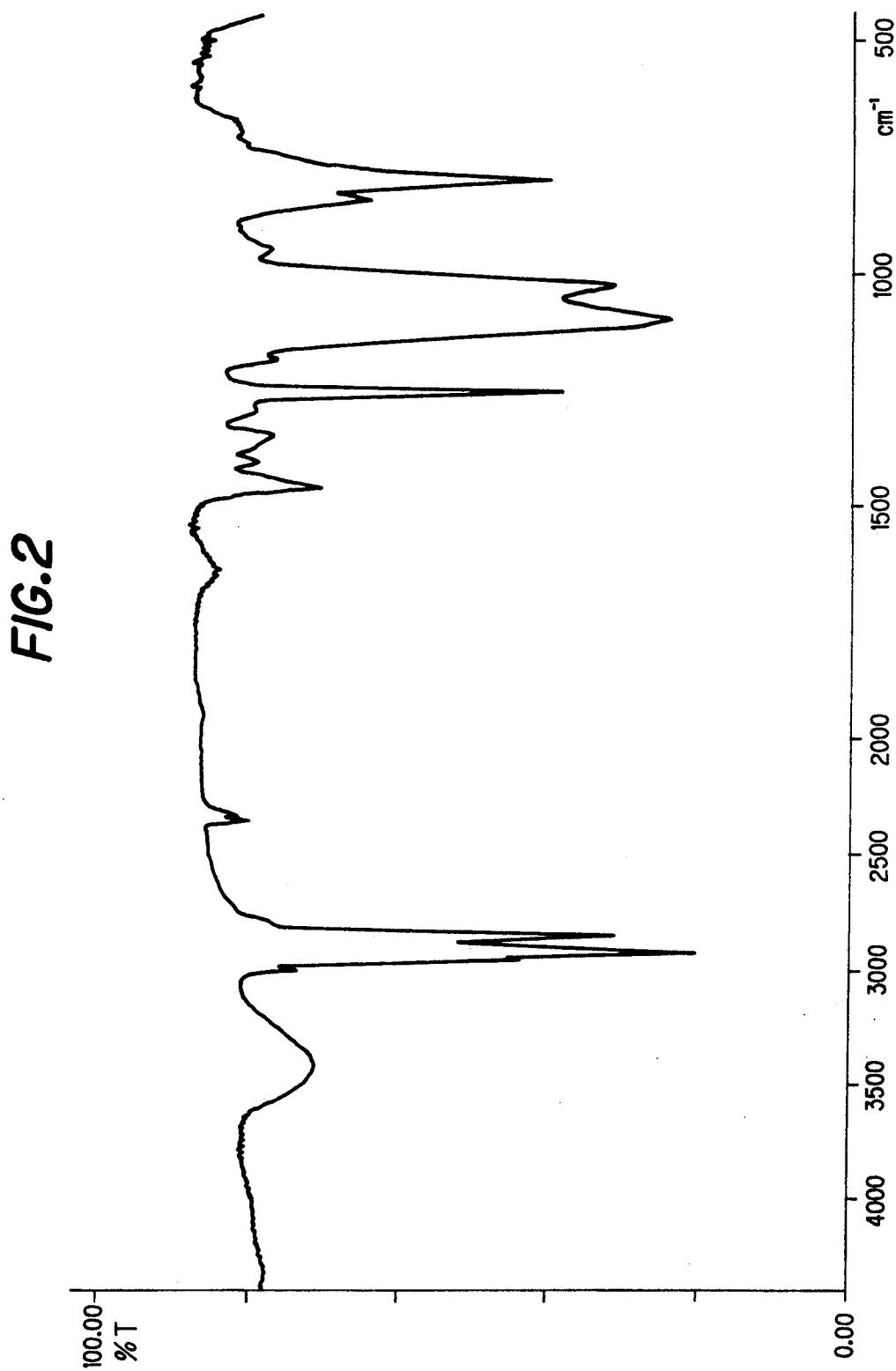

The thus obtained product was subjected to the measurements of the $^1$H-NMR spectrum and infrared absorption spectrum to give the results shown in FIGS. 1 and 2, respectively. The analytical result of the NMR spectrum led to a conclusion that this product compound was expressed by the formula

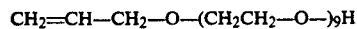

in which Me is a methyl group, $G^1$ is a polyoxyethylene group of the formula $-(CH_2)_3-O-(CH_2CH_2-O-)_9H$ and $E^1$ is a 3-oleyloxypropyl group of the formula $-(CH_2)_3-O-C_{18}H_{35}$.

Figure 3:
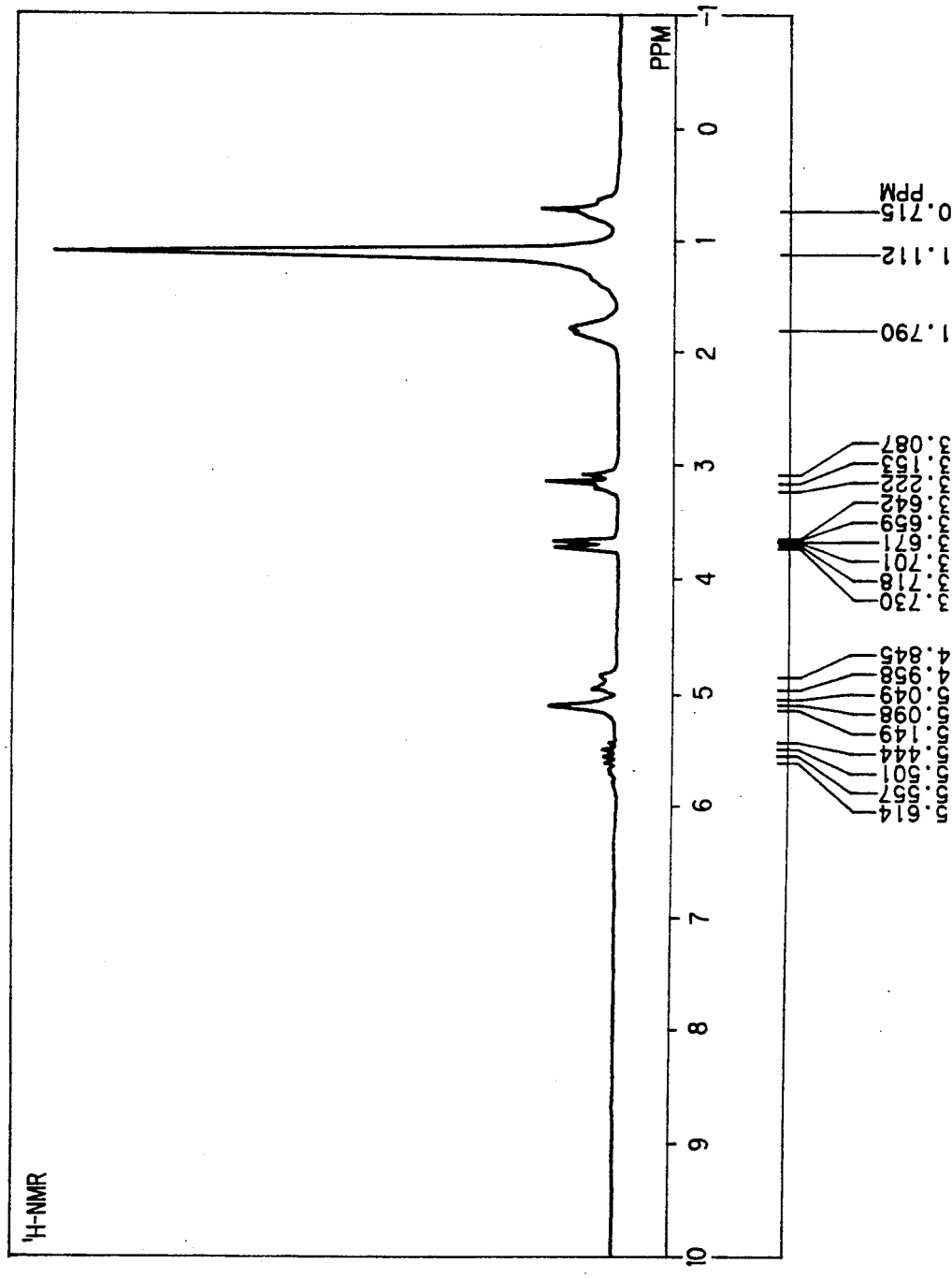
FIGS. 3 and 4 are each an NMR spectrum and an infrared absorption spectrum, respectively, of the allyl oleyl ether used in Example 1 as a modifying agent of the organopolysiloxane.
Figure 4:
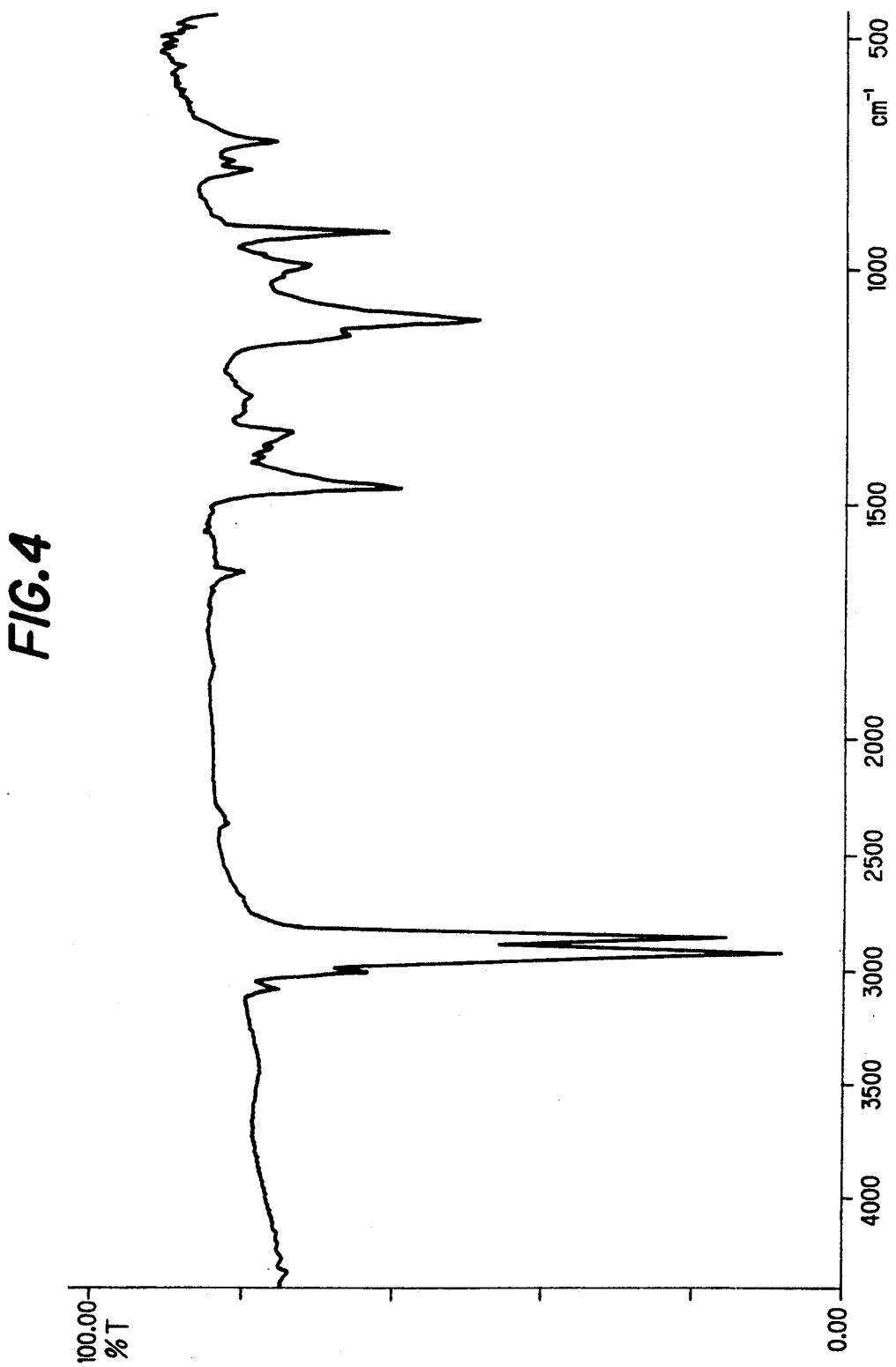

As is understood from comparison of the spectra of FIGS. 1 and 2 with those in FIGS. 3 and 4, which are a $^1$H-NMR spectrum and infrared absorption spectrum, respectively, of allyl oleyl ether, the NMR signals having chemical shifts of 4.8 to 5.0 ppm and 5.4 to 5.6 ppm in FIG. 3 assignable to the allyl group are no longer found in the NMR spectrum of FIG. 1 indicating complete disappearance of the allyl groups in the reaction product as a consequence of the hydrosilation reaction of both of the modifying reactants.

EXAMPLE 2

A reaction mixture was prepared by mixing, in a flask of 2 liter capacity, 183 g (0.1 mole) of the same methyl hydrogen polysiloxane as used in Example 1, 310 g (1 mole) of allyl isodtearyl ether, 136 g (0.3 mole) of the same allylated polyoxyethylene as used in Example 1 and 500 g of ethyl alcohol as the solvent with further admixture of 2 g of an ethyl alcohol solution of a vinyl siloxane complex of chloroplatinic acid in a concentration of 0.5% by weight as platinum and the reaction mixture was heated under reflux for 5 hours to effect the hydrosilation reaction. After completion of the reaction, the reaction mixture was freed from the solvent by evaporation under reduced pressure and the unevaporated residual liquid was filtered to give 610 g, corresponding to 95% of the total amount of the reactants, of an oily product having a viscosity of 447 centistokes at 25° C. and refractive index of 1.4462 at 25° C.

Figure 5:
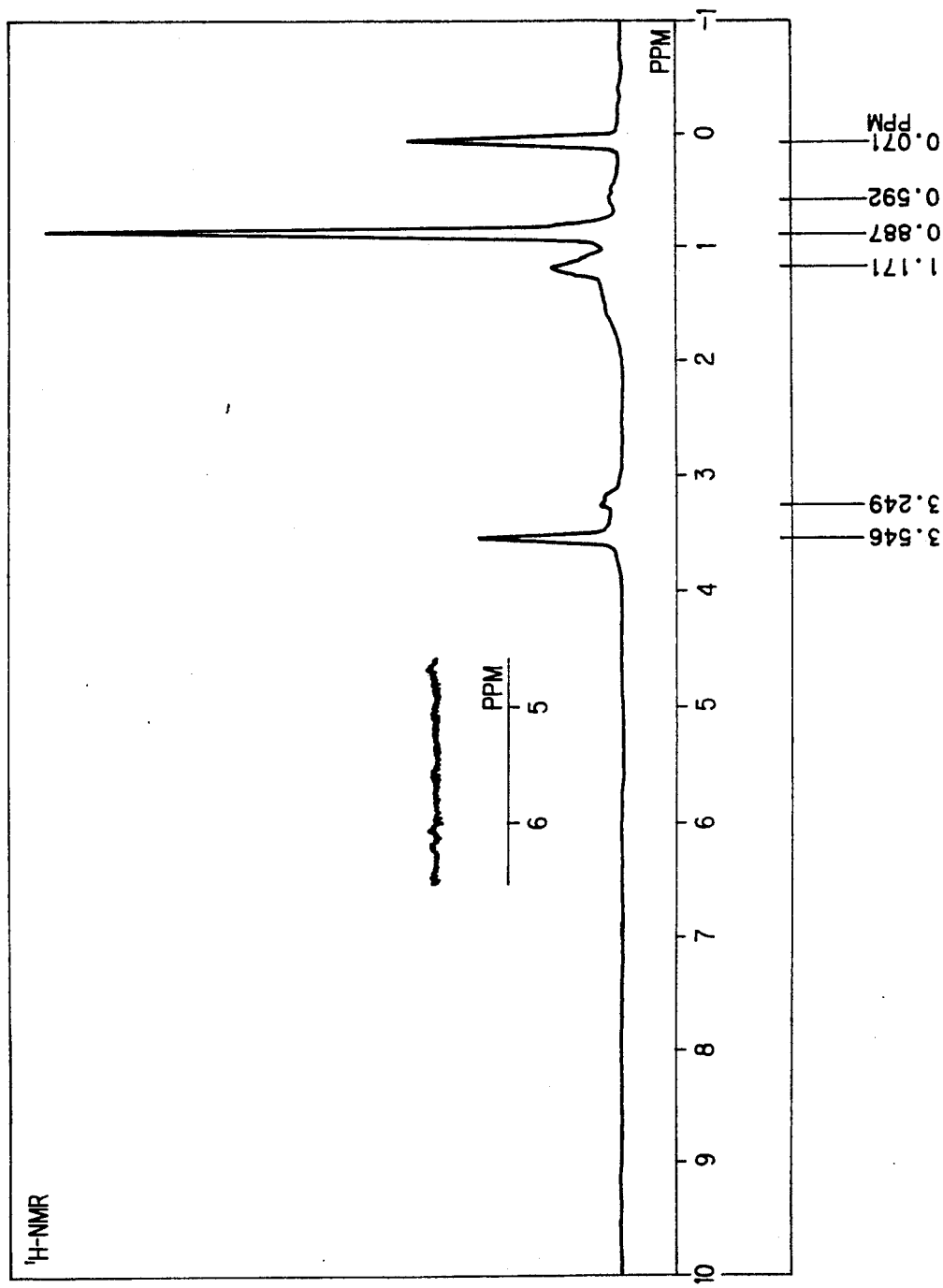
FIGS. 5 and 6 are each an NMR spectrum and an infrared absorption spectrum, respectively, of the inventive organopolysiloxane modified jointly with polyether groups and long-chain aliphatic ether groups as prepared in Example 2.
Figure 6:
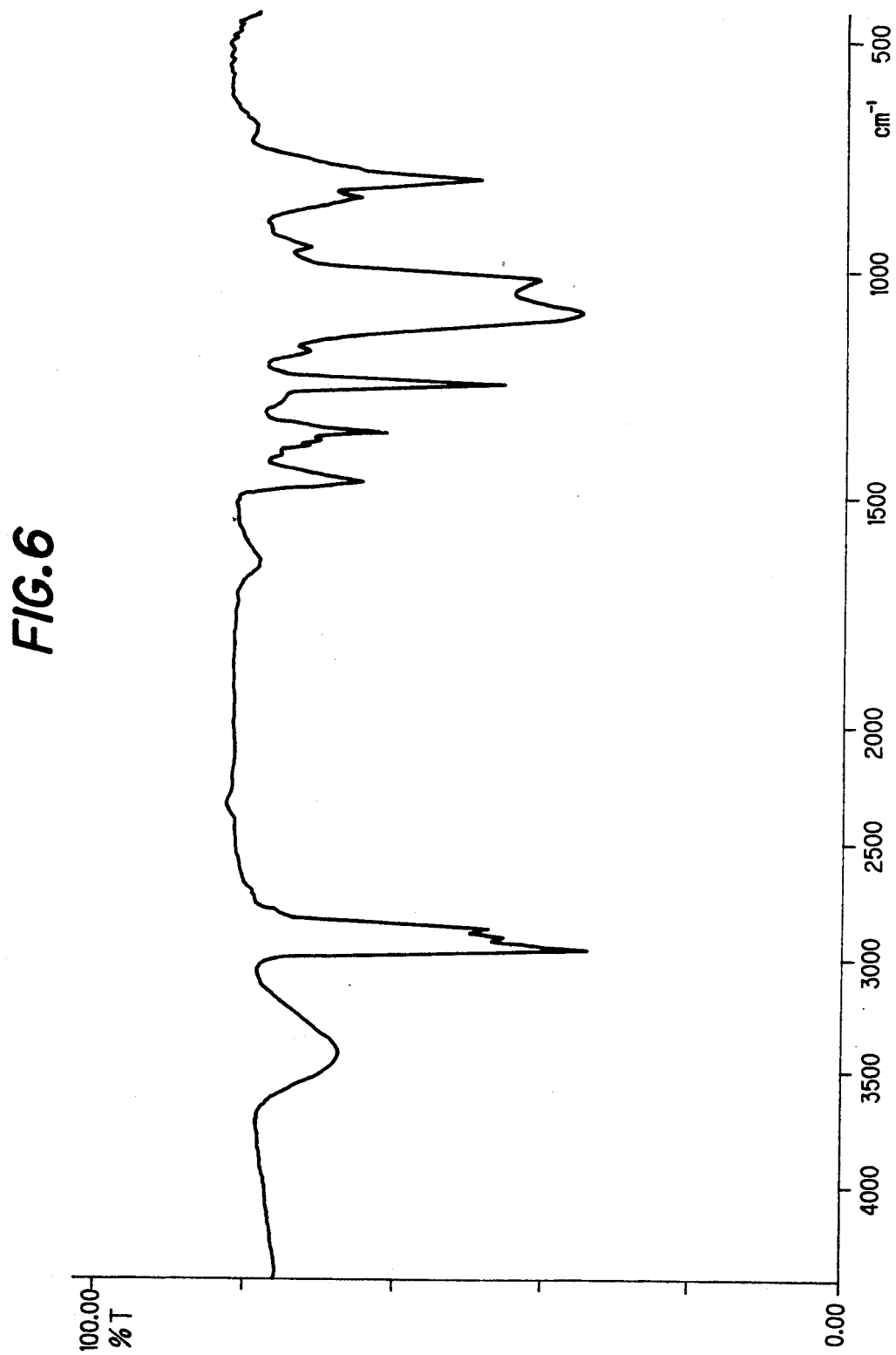

The thus obtained product was subjected to the measurements of the $^1$H-NMR spectrum and infrared absorption spectrum to give the results shown in FIGS. 5 and 6, respectively. The analytical result of the NMR spectrum led to a conclusion that this product compound was expressed by the formula

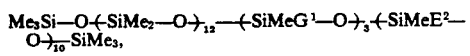

in which Me is a methyl group, $G^1$ is a polyoxyethylene group of the formula $-(CH_2)_3-O-(CH_2CH_2-O-)_9H$ and $E^2$ is a 3-isostearyloxypropyl group of the formula $-(CH_2)_3-O-C_{18}H_{37}$.

Figure 7:
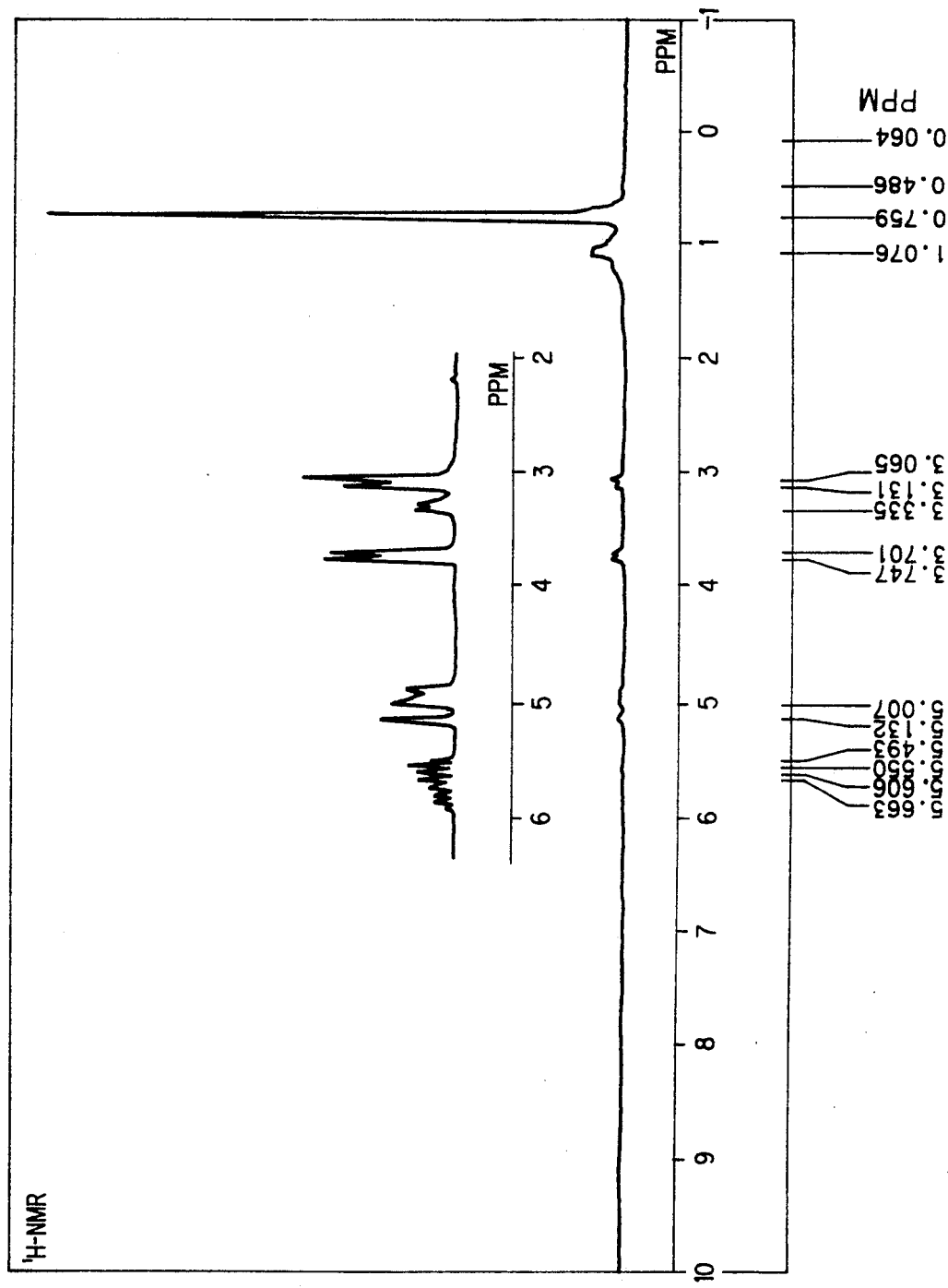
FIG. 7 is an NMR spectrum of the allyl isostearyl ether used in Example 2 as a modifying agent of the organopolysiloxane.

As is understood from comparison of the NMR spectrum of FIG. 5 with that in FIG. 7, which is a $^1$H-NMR spectrum of allyl isostearyl ether, the NMR signals assignable to the allyl groups are no longer found in the NMR spectrum of FIG. 5 indicating complete disappearance of the allyl groups in the reaction product as a consequence of the hydrosilation reaction of both of the modifying reactants.

EXAMPLE 3

The reaction procedure was just the same as in Example 1 excepting replacement of 308 g (1 mole) of allyl oleyl ether with 254 g (1 mole) of allyl myristyl ether to give 527 g, corresponding to 92% of the total amount of the reactants, of an oily product having a viscosity of 209 centistokes at 25° C. and refractive index of 1.4445 at 25° C.

The result of the NMR measurement of this product led to a conclusion that this product could be expressed by the formula

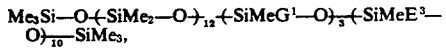

in which Me is a methyl group, $G^1$ is a polyoxyethylene group of the formula $-(CH_2)_3-O-(CH_2CH_2-O-)_9H$ and $E^3$ is a 3-myristyloxypropyl group of the formula $-(CH_2)_3-O-C_{14}H_{29}$.

The NMR spectrum of this compound indicated complete disappearance of the allyl groups in the product.

APPLICATION EXAMPLE

The jointly modified organopolysiloxanes prepared in Examples 1 to 3 were each used as an emulsifying agent in the preparation of a water-in-oil emulsion. Thus, two water-in-oil emulsions, referred to as the Emulsions Ia and Ib hereinbelow, were prepared by taking 4.7 g of glycerin triisooctanoate (Trifat S-308, a product by Nikko Chemicals Co.) or isocetyl stearate (Nikkol ICS, a product of the same company, supra), respectively, 0.3 g of the jointly modified organopolysiloxane prepared in Example 1 as the emulsifying agent and 5.0 g of purified water in a test tube of 18 mm inner

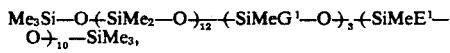

diameter and the test tube containing the mixture was heated for 10 minutes on a hot water bath at 68° to 73° C. followed by agitation for 60 seconds with a stirrer to give an emulsion.

In just the same manner and in the same formulation as above, two more water-in-oil emulsions, referred to as the Emulsions IIa and IIb hereinbelow, were prepared from glycerin triisooctanoate or isocetyl stearate, respectively, excepting the use of the jointly modified organopolysiloxane prepared in Example 2 as the emulsifying agent.

Further, two further more water-in-oil emulsions, referred to as the Emulsions IIIa and IIIb hereinbelow, were prepared in just the same manner and in the same formulation as above from glycerin triisooctanoate or isocetyl stearate, respectively, excepting the use of the jointly modified organopoly-siloxane prepared in Example 3 as the emulsifying agent.

For comparison, two more emulsions, referred to as the Emulsions IVa and IVb hereinbelow, were prepared in just the same manner and in the same formulation as above from glycerin triisooctanoate or isocetyl stearate, respectively, excepting the use of a polyether-modified organopolysiloxane expressed by the formula

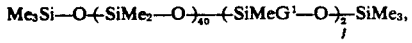

in which each symbol has the same meaning as defined above, as the emulsifying agent in place of the jointly modified organopolysiloxane.

For further comparison, two more emulsions, referred to as the Emulsions Va and Vb hereinbelow, were prepared in just the same manner and in the same formulation as above from glycerin triisooctanoate or isocetyl stearate, respectively, excepting the use of a polyether- and long-chain alkyl-modified organopolysiloxane expressed by the formula

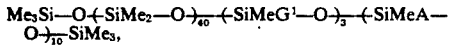

in which Me and $G^1$ each have the same meaning as defined above and A is a myristyl group $—C_{14}H_{29}$, as the emulsifying agent in place of the jointly modified organopolysiloxane of the present invention.

The thus prepared ten emulsions were kept standing at 20° C. in the test tube up to 60 minutes after termination of agitation to examine the stability of the respective emulsions. The results were that the Emulsions Ia, Ib, IIa, IIb, IIIa and IIIb were quite stable showing absolutely no phase separation even after 60 minutes of standing. On the other hand, the Emulsion IVa was found that the emulsified state was kept at least visually unchanged after 1 minute from termination of agitation but phase separation had taken place after 60 minutes of standing. Further, phase separation took place in the Emulsion IVb already after 1 minute of standing. In the Emulsions Va and Vb, no phase separation was noted after 1 minute of standing but the emulsion had been destroyed after 60 minutes of standing.

What is claimed is:

1. An organopolysiloxane compound modified jointly with polyether groups and long-chain aliphatic ether groups represented by the general formula

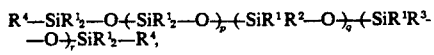

in which $R^1$ is an alkyl group having 1 to 4 carbon atoms, $R^2$ is a polyether group of the formula

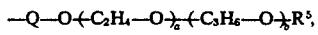

Q being a divalent hydrocarbon group having 2 to 4 carbon atoms, $R^5$ being a hydrogen atom, alkyl group having 1 to 4 carbon atoms or acetyl group, the subscript a being a positive integer and the subscript b being zero or a positive integer, $R^3$ is a long-chain aliphatic ether group of the formula

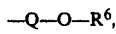

Q having the same meaning as defined above and $R^6$ being a monovalent hydrocarbon group having 8 to 30 carbon atoms, $R^4$ is $R^1$, $R^2$ or $R^3$, the subscript p is zero or a positive integer and the subscripts q and r are each a positive integer.

2. The organopolysiloxane compound modified jointly with polyether groups and long-chain aliphatic ether groups as claimed in claim 1 in which $R^1$ is a methyl group.

3. The organopolysiloxane compound modified jointly with polyether groups and long-chain aliphatic ether groups as claimed in claim 1 in which the divalent hydrocarbon group denoted by Q is a propylene group $—CH_2CH_2CH_2—$.

4. The organopolysiloxane compound modified jointly with polyether groups and long-chain aliphatic ether groups as claimed in claim 1 in which the group denoted by $R^6$ is an oleyl group or an isostearyl group.

5. The organopolysiloxane compound modified jointly with polyether groups and long-chain aliphatic ether groups as claimed in claim 1 in which the subscript b is zero.

* * * * *

UNITED STATES PATENT AND TRADEMARK OFFICE
CERTIFICATE OF CORRECTION

PATENT NO. :  5,104,998
DATED      :  April 14, 1992
INVENTOR(S) :  Shoji Ichinohe It is certified that error appears in the above-identified patent and that said Letters Patent is hereby corrected as shown below:

Title page, item [54] and col. 1, in the title change,

"APLIPHATIC" to read --ALIPHATIC--

Signed and Sealed this

Fourteenth Day of September, 1993

Attest:

BRUCE LEHMAN

*Attesting Officer*  *Commissioner of Patents and Trademarks*